United States Patent
Hou et al.

(10) Patent No.: US 10,232,312 B2
(45) Date of Patent: Mar. 19, 2019

(54) DEVICE AND PROCESS FOR FLUORINE RECOVERY FROM SMOKE AFTER PHOSPHORUS ABSORPTION BY HYDRATION IN KILN PROCESS FOR PRODUCTION OF PHOSPHORIC ACID

(71) Applicant: SICHUAN KO CHANG TECHNOLOGY CO., LTD, Chengdu (CN)

(72) Inventors: Yonghe Hou, Chengdu (CN); Shifa Wei, Chengdu (CN); Chenjuan Wei, Chengdu (CN)

(73) Assignee: SICHUAN KO CHANG TECHNOLOGY CO., LTD, Chengdu (CN)

( * ) Notice: Subject to any disclaimer, the term of this patent is extended or adjusted under 35 U.S.C. 154(b) by 517 days.

(21) Appl. No.: 14/958,811

(22) Filed: Dec. 3, 2015

(65) Prior Publication Data

US 2016/0082388 A1 Mar. 24, 2016

Related U.S. Application Data

(63) Continuation of application No. PCT/CN2013/081135, filed on Aug. 9, 2013.

(30) Foreign Application Priority Data

Jun. 4, 2013 (CN) .......................... 2013 1 0218491

(51) Int. Cl.
 *B01D 53/68* (2006.01)
 *C01B 7/20* (2006.01)
 *B01D 53/77* (2006.01)

(52) U.S. Cl.
 CPC ............ *B01D 53/68* (2013.01); *B01D 53/77* (2013.01); *C01B 7/20* (2013.01);
 (Continued)

(58) Field of Classification Search
 None
 See application file for complete search history.

(56) References Cited

U.S. PATENT DOCUMENTS 3,091,513 A 5/1963 Parish
3,273,713 A 9/1966 Parish
(Continued)

FOREIGN PATENT DOCUMENTS

CN 90105433.X C 10/1991
CN 93111447.0 C 12/1994
(Continued)

OTHER PUBLICATIONS

CN-101049920-A English Translation (Year: 2007).*
(Continued)

*Primary Examiner* — Anita Nassiri-Motlagh
(74) *Attorney, Agent, or Firm* — Syncoda LLC; Feng Ma

(57) ABSTRACT

A device and process for fluorine recovery from smoke after phosphorus absorption by hydration in KPA, wherein the device comprises a first-stage and second-stage fluorine absorption tower, which are both fluidized counter-current washing towers. The device according to the present invention has simple structure, low investment cost, high raw material utilization rate, and good fluorine recovery effects.

4 Claims, 5 Drawing Sheets

(52) U.S. Cl.
CPC .................. *B01D 2257/204* (2013.01); *B01D 2257/2066* (2013.01); *Y02P 20/154* (2015.11)

(56) References Cited

U.S. PATENT DOCUMENTS

| | | | |
|---|---|---|---|
| 4,351,809 A | | 9/1982 | Megy |
| 2006/0066013 A1 | | 3/2006 | Amritphale |

FOREIGN PATENT DOCUMENTS

| | | | | |
|---|---|---|---|---|
| CN | 1843901 | A | | 10/2006 |
| CN | 1974380 | A | | 6/2007 |
| CN | 101049920 | A | * | 10/2007 |
| CN | 200710052195.4 | A | | 10/2007 |
| CN | 101081348 | A | | 12/2007 |
| CN | 101157449 | A | | 4/2008 |
| CN | 101474523 | A | * | 7/2009 |
| CN | 200810069080.0 | A | | 7/2009 |
| CN | 202015577 | U | | 10/2011 |
| CN | 102826552 | A | | 12/2012 |

OTHER PUBLICATIONS

CN-101474523-A English Translation (Year: 2009).*
International Search Report in international application No. PCT/CN2013/081135, dated Mar. 6, 2014.
English Translation of the Written Opinion of the International Search Authority in international application No. PCT/CN2013/081135, dated Mar. 6, 2014.
George C. Pedersen, "State of the Art in Gas Cleaning for the Fertilizer Industry," Arab Fertilizer Association, 2001.
U.S. Environmental Protection Industry. AP42. Fifth Edition, vol. I, Inorganic Chemical Industry, Chapter 8, Jul. 1993 (Reformatted Jan. 1992): Section 8.9 Phosphoric Acid, pp. 8.9-1-8.9-8.
Leder, Ind. Eng. and Chem. Process Design and Development, 24(3), pp. 688-697, 1985.
Arab Fertilizer Association, Fertilizer Industry: Fertilizer Development & Environmental Protection, pp. 1-8 (2008).
K. Sampane, M. Al-hjouj, F. Doudin, Arab Fertilizer Association, "Fluosilisic Acid: Recovery Systems and aluminum Fluoride production," AFA Publication—Oct. 2011.
Paul A. Smith, "History of Fluorine Recovery Processes," IFA Technical Sub-Committee and Committee Meeting Sep. 15-17, 1999, Novgorod, Russia.
European Fertilizer Manufacturers' Association, "Production of Phosphoric Acid", Booklet 4, pp. 25 (2000).
John Munroe Craig, "Fluoride Removal from Wet-Process Phosphoric Reactor Gases," PhD Dissertation, University of Florida, pp. 78.85, 1970.
H.Y. Allgood et al., Industrial and Engineering Chemistry, vol. 59, p. 18 (Jun. 1967).
Tennessee Valley Authority, "Design of Equipment to Produce Phosphoric Acid from Elemental Phosphorous", pp. 1-35 (Jun. 1970).
John R. Van Wazer, "Phosphorus and It's Compounds, In Two Volumes," Interscience Publishers, Inc., New York 1961.
M.M. Stripling, "Development of Process Equipment for Production of Phosphoric Acid," Tennessee Valley Authority, Chemical Engineering Report No. 2, Wilson Dam, Alabama 1948.

* cited by examiner

1

DEVICE AND PROCESS FOR FLUORINE RECOVERY FROM SMOKE AFTER PHOSPHORUS ABSORPTION BY HYDRATION IN KILN PROCESS FOR PRODUCTION OF PHOSPHORIC ACID

CROSS-REFERENCE TO RELATED APPLICATION

The application is a continuation of PCT/CN2013/081135 (filed on Aug. 9, 2013), which claims priority from CN Patent Application Serial No. 201310218491.2 (filed on Jun. 4, 2013), the entire contents of which are incorporated herein by reference for all purposes.

FIELD OF THE INVENTION

The present invention relates to a device and process for fluorine recovery from smoke, particularly a device and process for fluorine recovery from smoke after phosphorus absorption by hydration in kiln process for production of phosphoric acid (KPA).

BACKGROUND

There are chiefly two processes for producing phosphoric acid in industry. (1) producing phosphoric acid with a wet process: using sulfuric acid to decompose phosphate ore to obtain dilute phosphoric acid and solid slag (briefly called phosphogypsum) with $CaSO_4.nH_2O$ as a main component, and concentrating the dilute phosphoric acid to obtain wet-process phosphoric acid with about 54% phosphoric acid. This process has the following major drawbacks: the first drawback is large consumption of sulfuric acid; the second drawback is that the slag phosphogypsum cannot be used effectively, and sulfuric acid, phosphoric acid and soluble fluorides entrained therein are all soluble in water, and rain wash of the slag piled in the nature is apt to cause serious pollution to the environment; the third drawback is that the resultant phosphoric acid contains higher content of impurities and is generally only used to produce fertilizer; and the fourth drawback is that high-grade phosphate ore must be used to ensure economy of the product. (2) producing phosphoric acid with a hot process: first, placing phosphate ore, silica and carbonaceous solid reducing agent in an ore-smelting electric furnace, raising a temperature in the furnace to 1300° C. with energy of electric arc formed by electrical short-circuiting, reducing phosphor in the phosphate ore in the form of $P_4$, meanwhile converting carbonaceous solid reducing agent into CO, washing gas mainly containing $P_4$ and CO discharged out of the ore-smelting electric furnace with water, cooling $P_4$ into solid to separate from gas phase to obtain the product yellow phosphorus, igniting and burning exhaust gas containing CO at an outlet of a chimney and exhausting to the atmosphere; heating the obtained $P_4$ to 80° C. to change it into liquid phase, subjecting it to oxidization combustion reaction with introduced air in a hydration tower to obtain phosphoric anhydride $P_2O_5$, and then absorbing it with water to obtain phosphoric acid. The hot-process production of phosphoric acid has the following main drawbacks: the first drawback is large consumption of electrical energy; the second drawback is that gas discharged out of the ore-smelting electric furnace, from which $P_4$ is already separated, still entrains a large amount of fluorides (existing in the form of $SiF_4$ and HF) and a small amount of un-deposited gas P4, which causes serious pollution to the atmospheric environment; the third drawback is that gas containing a large amount of CO is directly burnt and exhausted, which causes large waste of energy; the fourth drawback is that high-grade phosphate ore needs to be used to ensure economy of the production.

To overcome impact on production of phosphoric acid exerted by shortage of electrical energy, insufficient pyrites resources and gradual reduction of high-grade phosphate core, Occidental Research Corporation of the United States proposed a KPA process in 1980's, i.e., a process of producing phosphoric acid with a rotary kiln (briefly called a phosphoric acid producing process with a kiln) (see Frederic Ledar and Won C. Park, et al., New Process for Technical-Grade Phosphoric Acid, Ind. Eng. Chem. Process Des. Dev 1985, 24, 688-697), and carried out a pilot experiment of a pilot device in a 0.84 m (inner)×9.14 m (see the US patent document U.S. Pat. No. 4,389,384). According to this process, phosphate ore, silica and carbonaceous reducing agent (coke powder or coal powder) are co-ground so that 50%-85% pass 325 mesh, with 1% bentonite being added to produce balls, which are dried and preheated by a chain-type dryer and then delivered into a rotary kiln with a kiln head in which natural gas is burnt, pellets are reduced in the kiln, a maximum solid temperature is controlled as 1400° C.-1500° C., pellet $CaO/SiO_2$ mole ratio is adjusted as 0.26-0.55 so that the a melting point of the pellet is higher than a carbon thermal reduction temperature of the phosphate core in the pellets, phosphor is reduced and volatiles out of the pellets in the form of phosphoric vapor, and then oxidized by air introduced in a middle space of the kiln into phosphorous pentoxide, heat resulting from oxidization is then supplied to the reduction reaction, and finally kiln gas containing phosphorous pentoxide is hydrated and absorbed to obtain phosphoric acid.

The idea of the above processing phosphoric acid with a kiln exhibits an excellent industrial application prospect because its principle is to form $P_4$ gas using carbon thermal reduction of the phosphate ore, transfer phosphorus in the phosphate ore to gas phase of the rotary kiln, use a gas-solid separation principle to enable phosphorus to be well separated from other solid substances in the balls, allow the $P_4$ gas transferred into the gas phase of the rotary kiln to go through an oxidization heat liberation reaction with oxygen in the gas phase of the rotary kiln to generate $P_2O_5$, supply the liberated heat to carbon thermal reduction (endothermic reaction) of the phosphate ore in the material balls, and finally hydrate and absorb the kiln gas containing $P_2O_5$ exiting the rotary kiln to obtain industrial phosphoric acid having a cleanliness much higher than the phosphoric acid produced with the wet process. Since the rotary kiln uses primary energy to maintain phosphate ore carbon terminal reduction temperature, and meanwhile flammable substance $P_4$ generated from the phosphate ore carbon terminal reduction and CO are subjected to the combustion heat liberation reaction in the interior of the rotary kiln to replenish the energy needed to maintain the phosphate ore carbon terminal reduction temperature in the rotary kiln, this process substantially reduces energy consumption as compared with the conventional hot process of producing phosphoric acid.

However, the research indicates that it is very difficult to implement the process of producing phosphoric acid with the kiln in large-scale industrial application and practice and its main drawbacks are as follows:

1. A rotary kiln is an apparatus with a kiln body rotating at a certain speed (0.5 r/min-3 r/min), and it is advantageous in continuously performing mechanical turn and mixture of a solid material fed into the kiln to ensure uniformity of heat reception of the solid material at all locations in the kiln.

However, the solid material in the kiln must bear a mechanical frictional force resulting from movement of the material. If the strength of the material is smaller than the received mechanical frictional force, the material can be easily destroyed. A basic principle of the KPA process proposed by ORC corporation is to co-grind the phosphate ore, the silica and the carbonaceous reducing agent (coke powder or coal powder) so that 50%-85% of the co-ground materials pass 325 mesh, and then produce them into pellets, the three kinds of substances must be closely copolymerized into a whole so that the mixture does not melt at the carbon thermal reduction temperature of the phosphate ore under the condition the $CaO/SiO_2$ mole ratio in the mixture is 0.26-0.55, and meanwhile carbon reduction of the phosphate ore can be performed smoothly. However, since the reducing agent carbon is added to the material pellets used in the process, carbon goes through quick oxidization reaction with oxygen in air at a temperature greater than 350° C. to produce $CO_2$. If a conventional method of consolidating pellets at a high temperature at a chain grate in the metallurgical industry is employed, the reducing carbon in the pellets will be all oxidized, the pellets entering the rotary kiln will lose the reducing agent, carbon thermal reduction reaction of the phosphorus naturally cannot be performed, and the process fails as a result. If only the bentonite is added as a bonding agent of the pellets to perform drying and dehydration at a temperature less than 300° C., an anti-pressure strength of the pellets is only about 10 KN per ball, with a falling strength e metallurgical industry is employed, the reducing carbon in the pellets will be all oxidize water in its substance structure to adjust a moisture content release speed during the drying of the pellets and improve a burst temperature of the pellets during the drying, and bentonite itself does not play a remarkable role in improving the strength of the pellets. After such pellets are fed into the rotary kiln and before the rotary kiln temperature value reaches 900° C., since the pellets entering the kiln cannot bear the mechanical frictional force resulting from movement of material balls in the pellets, a lot of said pellets are pulverized, and thereafter the phosphate ore powder, silica powder and carbonaceous reducing agent forming the pellets will separate, the phosphate ore powder after pulverization causes failure of reduction of phosphorus as it cannot get in close contact with carbonaceous reducing agent. More seriously, once the phosphate ore powder separates from silica powder, its melting point abruptly falls below 1250° C. When such powder-like phosphate ore passes through a high-temperature reducing area (with a material layer temperature of 1300° C. or so) of the rotary kiln, it will totally changes from solid phase into a liquid phase, and thereby adheres to a liner of the rotary kiln to form high-temperature ringing of the rotary kiln, which hinders normal rotation of the materials in the rotary kiln so that a majority of materials added into the rotary kiln overflows from the rotary kiln from a feeding end of the rotary kiln, high-temperature reduction of phosphorus cannot be achieved and the process fails. It can be seen that the raw materials entering the kiln have their intrinsic drawbacks, any industrialized, large-scale or commercialized application of the above-mentioned KPA technology has not yet been witnessed so far.

2. Regarding the KPA process with the phosphate ore pellets with carbon being added, a solid material area below a material layer in the rotary kiln belongs to a reduction zone, and a gas flow area of the rotary kiln is above the material layer and belongs to an oxidization zone, the feed pellets are added from a kiln tail of the rotary kiln and discharged out of a kiln head of the rotary kiln by virtue of its own gravity and a frictional force resulting from rotation of the rotary kiln, a burner for burning fuel in the rotary kiln is mounted at the kiln head of the rotary kiln, fume resulting from the burning is introduced out by a blower at the kiln tail, a micro negative pressure is maintained in the rotary kiln, and the gas flow is opposite to a movement direction of the materials. Since there is not a mechanical isolation area between the reduction zone (solid material layer area) and the oxidization zone (the gas flow area above the solid material layer area of the rotary kiln) of the rotary kiln, the material balls exposed on the surface of the solid material layer area and $O_2$, $CO_2$ in the gas flow in the oxidization zone are subjected to convective mass transfer; on the one hand, this causes the reducing agent in the material balls to be partially oxidized before the material balls are heated by the gas flow heat transfer to the carbon reduction temperature of the phosphate ore so that the material balls are not sufficiently reduced due to shortage of carbonaceous reducing agent in the reduction zone of the rotary kiln; more seriously, the material balls exposed to the surface of the material layer at the high-temperature area of the rotary kiln is further subjected to chemical reaction with $P_2O_5$ already generated from reduction in the kiln gas to produce calcium metaphosphate, calcium phosphate and other metaphosphates or phosphates, thereby causing the phosphorus already reduced into the gas phase to return to the material balls again and form a layer of white crust rich in $P_2O_5$ on the surface of the material balls, the layer of crust generally having a thickness of 300 μm-1000 μm, the content of $P_2O_5$ in the layer of crust topping 30%; as a result, $P_2O_5$ transferred from the material balls to the gas phase does not exceed 60%, which cause a lower yield ratio of $P_2O_5$ in the phosphate ore and thereby causes waste of mineral resources and large rise of the phosphoric acid production cost so that the above KPA process losses value in respect of commercial application and industrial spread. Researchers desire gas volatized from the material layer to isolate the reduction zone from the oxidization zone in the rotary kiln, but industrial experiments performed in a rotary kiln with an inner diameter 2 m show that the phenomena of white crust rich in $P_2O_5$ on the surface of the pellets still cannot be avoided.

Due to the above-mentioned technical drawbacks, it is still very difficult to use the KPA process proposed by ORC corporation in large-scale industrial application and practice to produce phosphoric acid.

Joseph A. Megy proposes some improved technical methods with respect to the KPA process (see patent document U.S. Pat. No. 7,910,080B), i.e., on the premise of maintaining the basis process of KPA unchanged, providing a material stopping ring on a kiln head material discharging end of the cylinder of the rotary kiln to improve a solid material filling rate of the rotary kiln, and meanwhile increasing the diameter of the rotary kiln to reduce a surface area to volume ratio of an inner material layer of the rotary kiln, reduce probability of the material of the material layer being exposed to the surface of the solid material layer to shorten the time that the reducing agent carbon in the material balls is oxidized by $O_2$ in the kiln gas in the rotary kiln, reduce burn of the reducing agent carbon before the material balls reach the reduction zone of the rotary kiln and meanwhile decease generation of phosphates or metaphosphates on the surface of the material balls in the high-temperature area of the rotary kiln. In addition, according to the process, it is desired that partial petrol coke is added to the materials entering the rotary kiln so that reducing gas generated by a volatile matter in the petrol coke due to heat reception and volatilization is used to cover between the material layer and the gas flow oxidization area of the rotary kiln to further block the probability of the $O_2$ and $P_2O_5$ in the gas flow in the rotary kiln reacting with the material balls to ensure normal operation of the process. However, increase of the filling rate of the rotary kiln allows the material balls to bear larger mechanical frictional force in the rotary kiln, thereby causing a larger proportion of pulverization of the material balls in the rotary kiln, and forming more substances with a melting point lower than the phosphate ore carbon thermal reduction temperature so that the high-temperature ringing of the rotary kiln becomes quicker and more serious and earlier failure of the process is caused. In addition, the volatile matter generated by added small amount of petrol coke is not sufficient to produce sufficient gas and it is difficult to form an effective isolation layer between the solid material layer of the rotary kiln and the gas flow area in the rotary kiln. If an excessive amount is added, the materials in the rotary kiln will entrain a large amount of fuel so that in a slag ball cooling machine in the subsequent process, the redundant fuel is confronted with the air for cooling the slag balls and burns rapidly, a large amount of heat resulting from the burning not only increases the difficulty in cooling the high-temperature slag balls exiting the rotary kiln but also substantially improves the production cost of the process and makes implementation of the commercialized and large-scale application of the process impossible.

However, KPA process still presents a series of technical problems and some exist in the process for absorption of phosphorus by hydration and fluorine recovery in KPA. The process for absorption of phosphoric acid by hydration in KPA mainly drew on the experience of the method of absorption of phosphoric acid in hot process for production of phosphoric acid, however, the smoke exiting the kiln in KPA is very different from the smoke produced by combustion of yellow phosphorus in hot process for production of phosphoric acid and the differences are as follows: firstly, the concentration of $P_2O_5$ in smoke exiting the kiln is lower, and with the same yield of smoke, the concentration of $P_2O_5$ in the smoke produced in former process is 3-4 times that of latter process; secondly, the smoke exiting the kiln is variable in composition, consisting of fluorine, dust, sulfur dioxide and other impurities. Using the method for absorption of phosphoric acid in hot process may cause the following problems: firstly, the lower production of smoke produced in hot process results in a lower flow rate of smoke in the corresponding equipment, and if this method for absorption of phosphoric acid in hot process is used in KPA process, the equipment system in KPA process will reach a quite large size, which may lead to be a complex structure and an increased cost of investment and operating; secondly, the variable impurities in smoke produced in KPA require a spraying acid with a higher corrosion, and the process and device for absorption of phosphoric acid need to be further improved to prevent the solid impurities in acid from blocking the equipment and pipeline; more importantly, the fluorine-containing substance (exists in form of $SiF_4$ and HF) in smoke exiting the kiln in KPA which is harmful to human needs to be recovered to avoid contamination of environment.

SUMMARY

The present invention provides a device for fluorine recovery from smoke after phosphorus absorption by hydration in KPA and a process for fluorine recovery using the device said above. The present invention has the advantages of simple structure, rational layout, low investment cost, strong adaptability, high raw material utilization rate, reduced pollutant emissions and good fluorine recovery effects etc.

The present invention provides a device for fluorine recovery from smoke after phosphorus absorption by hydration in KPA, comprising a first-stage and second-stage fluorine absorption tower, wherein the first-stage and second-stage fluorine absorption tower are both fluidised counter-current washing towers. The first-stage fluorine absorption tower mainly comprises a fluorosilicic acid washing pipe and a fluorosilicic acid separation tank, and the second-stage fluorine absorption tower mainly comprises a second-stage fluorosilicic acid washing pipe and a second-stage fluorosilicic acid separation tank.

According to the device described above, the mechanism of fluorine recovery in the first-stage and second-stage fluorine absorption tower is as follows: the collide of the smoke after phosphorus absorption by hydration flowing downward and the circulating concentrated fluorosilicic acid solution spraying upward in the counter-current fluorosilicic acid washing pipe drives the liquid to be sprayed on the pipe wall from inside radially. A foam zone (foam column) with a certain height is created on gas-solution interface and the foam column moves up and down along the pipe wall with changes of the relative momentum of gas and liquid. The capture and collection of particles, absorption of gas and transmission of heat occur in the foam zone because of the encounter of gas with large-area liquid surface which is constantly updated.

The present invention also provides a process for fluorine recovery from smoke after phosphorus absorption by hydration in KPA, comprising the following steps:

(1) The first-stage fluorine recovery: contracting the smoke after phosphorus absorption by hydration contacts with circulating fluorosilicic acid sprayed upward, and then the mass transfer and heat transfer between said smoke and circulating fluorosilicic acid occur;

(2) The first-stage gas-liquid separation: separating the gas and liquid obtained by the first-stage fluorine recovery;

(3) The second-stage fluorine recovery: contacting the smoke from first-stage gas-liquid separation with circulating fluorosilicic acid sprayed upward by a nozzle, and then the mass transfer and heat transfer between said smoke and circulating fluorosilicic acid occur;

(4) The second-stage gas-liquid separation: separating the gas and liquid obtained by the second-stage fluorine recovery.

LISTING OF PARTS

Figure 1:
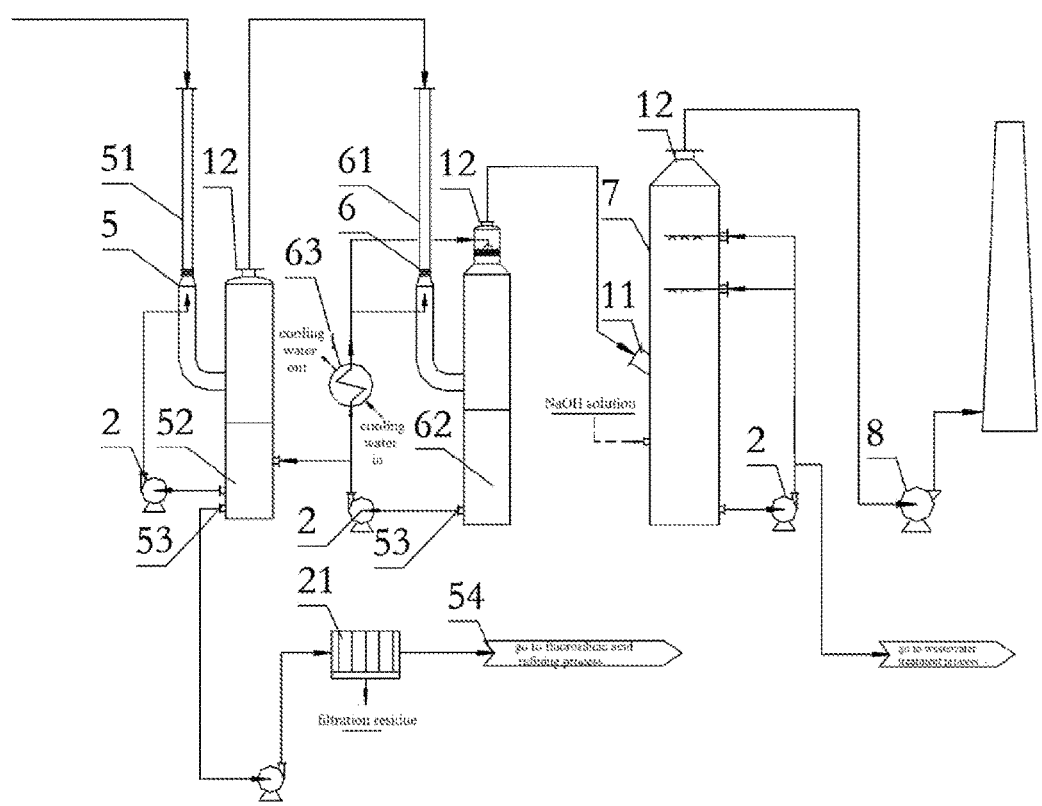
FIG. 1 is a structural schematic view of a device for fluorine recovery according to an embodiment of the present invention.
Figure 2:
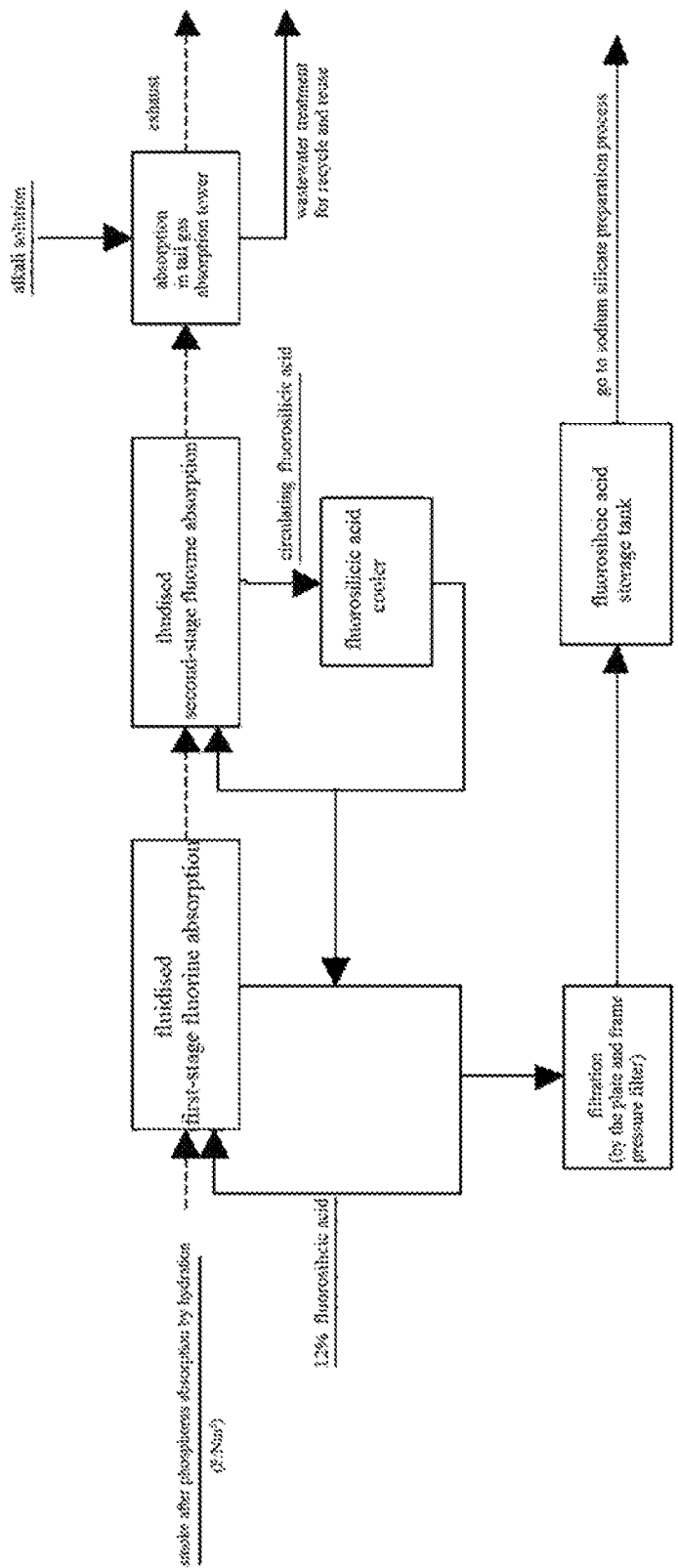
FIG. 2 is a flow chart of a process for fluorine recovery according to an embodiment of the present invention.

The reference number 1 denotes a hydration tower; 11 a smoke inlet; 12 a smoke outlet; 13 a spraying device; 14 a liquid inlet; 15 a liquid outlet; 16 an acid storage tank; 17 a water-cooling system; 18 an acid cooler; 2 a circulating pump; 21 a pressure filter; 22 a packing filter; 23 a phosphoric acid refining equipment; 24 a concentrated phosphoric acid spraying layer; 25 a dilute phosphoric acid spraying layer; 3 a phosphoric acid mist absorption tower; 31 a washing pipe; 32 a separation tank; 33 an acid outlet; 34 an acid inlet; 35 a nozzle; 4 a demisting separation tower; 41 an online water flushing device; 42 a mesh demister; 43 a phosphoric acid drop collection structure; 5 a first-stage fluorine absorption tower; 51 a fluorosilicic acid washing pipe; 52 a fluorosilicic acid separation tank; 53 a fluorosilicic acid liquid outlet; 54 a fluorosilicic acid refining equipment; 6 a second-stage fluorine absorption tower; 61 a second-stage fluorosilicic acid washing pipe; 62 a second-stage fluorosilicic acid separation tank; 63 a fluorosilicic acid cooler; 7 a tail gas absorption tower; 8 a draught fan.

DETAILED DESCRIPTION

The embodiments of the present invention are described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be through and complete, and will fully convey the scope of the invention to those skilled in the art. Among other things, the present invention may be embodied as systems, methods or devices. The following detailed description should not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on". The term "coupled" implies that the elements may be directly connected together or may be coupled through one or more intervening elements. Further reference may be made to an embodiment where a component is implemented and multiple like or identical components are implemented.

While the embodiments make reference to certain events this is not intended to be a limitation of the embodiments of the present invention and such is equally applicable to any event where goods or services are offered to a consumer.

The present invention provides a device for fluorine recovery from smoke after phosphorus absorption by hydration in KPA comprising a first-stage and second-stage fluorine absorption tower, which are both fluidised countercurrent washing towers. The first-stage fluorine absorption tower mainly comprises a fluorosilicic acid washing pipe and a fluorosilicic acid separation tank; wherein the fluorosilicic acid washing pipe inlet and outlet are connected to a conveying pipeline of smoke after phosphorus absorption by hydration and the middle part of the fluorosilicic acid separation tank, respectively; the top of the separation tank is provided with a smoke outlet, and at the bottom thereof a fluorosilicic acid liquid outlet is connected to a nozzle in the fluorosilicic acid washing pipe via a circulating and conveying pipeline which is provided with a circulating pump.

The second-stage fluorine absorption tower mainly comprises a second-stage fluorosilicic acid washing pipe and a second-stage fluorosilicic acid separation tank. The smoke outlet of the first-stage fluorine absorption tower is connected to the inlet of second-stage fluorosilicic acid washing pipe via a pipeline and the outlet of fluorosilicic acid washing pipe is connected to the middle part of second-stage fluorosilicic acid separation tank. The top of the second-stage fluorosilicic acid separation tank is provided with a defoaming layer and a smoke outlet, and at the bottom thereof a fluorosilicic acid liquid outlet is in communication with a nozzle in the second-stage fluorosilicic acid washing pipe and first-stage fluorosilicic acid separation tank via a circulating and conveying pipeline which is provided with a circulating pump.

In an embodiment of the present invention, the circulating and conveying pipeline in second-stage fluorine absorption tower is provided with a fluorosilicic acid cooler. The outlet of the fluorosilicic acid cooler is divided into two paths, one is connected to a nozzle in the second-stage fluorosilicic acid washing pipe and another is in communication with the spraying layer which is at the top of second-stage fluorosilicic acid separation tank.

In an embodiment of the present invention, the smoke inlet of the second-stage fluorine absorption tower is connected to a tail gas absorption tower which is an empty spraying tower. The top of the tail gas absorption tower is provided with a smoke outlet, and the upper part of inside thereof is provided with a spraying layer, and the bottom thereof is provided with an alkali absorption tank, and the outlet of the alkali absorption tank is connected to a spraying layer in the tail gas absorption tower via a circulating and conveying pipeline which has a circulating pump.

The present invention also provides a process for fluorine recovery from smoke after phosphorus absorption by hydration in KPA using the device described above which comprises the following steps:

(1) The first-stage fluorine recovery: contacting the smoke after phosphorus absorption by hydration flowing downward in the fluorosilicic acid washing pipe in the first-stage fluorine absorption tower with circulating fluorosilicic acid sprayed upward by a nozzle, and forming fluorosilicic acid after mass transfer and heat transfer between said smoke and circulating fluorosilicic acid, and the enthalpy in the smoke is partially transferred into the steam by adiabatic evaporation of water in circulating fluorosilicic acid solution;

(2) The first-stage gas-liquid separation: conveying the gas and liquid in the fluorosilicic acid washing pipe to the fluorosilicic acid separation tank for gas-liquid separation, and the gas obtained by separation flows into second-stage fluorosilicic acid washing pipe of the second-stage fluorine absorption tower via the smoke outlet of first-stage fluorine absorption tower, and conveying the remaining liquid in the fluorosilicic acid separation tank to fluorosilicic acid washing pipe for the operation in step (1) via a circulating and conveying pipeline, wherein the circulating and conveying pipeline has a circulating pump;

(3) The second-stage fluorine recovery: contacting the smoke flowing downward in the second-stage fluorosilicic acid washing pipe with circulating fluorosilicic acid sprayed upward by a nozzle, and forming fluorosilicic acid after mass transfer and heat transfer between said smoke and circulating fluorosilicic acid, and the enthalpy in the smoke is partially transferred into circulating fluorosilicic acid solution by heat transfer;

(4) The second-stage gas-liquid separation: conveying the gas and liquid in the second-stage fluorosilicic acid washing pipe to the second-stage fluorosilicic acid separation tank for gas-liquid separation, and the gas obtained by separation flows into the tail gas absorption tower to be further processed via the smoke outlet of second-stage fluorine absorption tower, and the remaining liquid in the fluorosilicic acid separation tank is partially transferred to second-stage fluorosilicic acid washing pipe for the operation in step (3) by a circulating pump and the rest of the liquid said above is transferred to fluorosilicic acid separation tank of the first-stage fluorine absorption tower;

(5) As the fluorosilicic acid solution in the first-stage fluorine absorption tower keeps increasing, removing silica gel in the extra fluorosilicic acid solution by filtered, and obtaining a byproduct of fluorosilicic acid.

In an embodiment of the present invention, in the step (1) the mass concentration and temperature of circulating fluorosilicic acid solution in first-stage fluorine recovery are in the range of 8 to 25 percent (especially, 10 to 20 percent) and 25° C. to 65° C. (especially, 50° C. to 65° C.), respectively, and the spraying liquid-gas ratio is controlled in the range of 3 L/m$^3$ to 25 L/m$^3$ (more particularly, 3 L/m$^3$ to 6 L/m$^3$); in the step (3), the mass concentration and temperature of circulating fluorosilicic acid solution in second-stage fluorine recovery are in the range of 0.5 to 5 percent and 25° C. to 60° C. (especially, 45° C. to 60° C.), respectively, and the spraying liquid-gas ratio is controlled in the range of 3 L/m$^3$ to 25 L/m$^3$ (especially, 3 L/m$^3$ to 6 L/m$^3$). In an embodiment of the present invention, in the step (3) the circulating fluorosilicic acid solution in the second-stage fluorosilicic acid washing pipe is cooled by the fluorosilicic acid cooler, and the temperature of smoke which has been processed by step (3) decreases below 60° C.

In an embodiment of the present invention, the said smoke after phosphorus absorption by hydration is obtained after hydration absorption in phosphoric acid production system which comprises a hydration tower, a circulating and spraying system for acid, a phosphoric acid mist absorption tower and a demisting separation tower; In an embodiment of the present invention, in step (1) the fluorine in the smoke (mainly $SiF_4$), reacts with water in circulating fluorosilicic acid solution to form the said fluorosilicic acid.

The said hydration tower is an empty spraying tower, and the lower part of the hydration tower is provided with a smoke inlet for the smoke exiting the kiln, and the top thereof is provided with a smoke outlet, and the bottom thereof is provided with a liquid inlet of the said circulating and spraying system for acid, and the outlet of the circulating and spraying system for acid is connected to the inlet pipe of a spraying device disposed in a chamber which is above the smoke inlet, and the circulating and spraying system for acid is also provided with an acid storage tank and a circulating pump; The said phosphoric acid mist absorption tower is a fluidised counter-current washing tower which mainly comprises a washing pipe and a separation tank, the inlet and outlet of the washing pipe are connected to a smoke outlet of the said hydration tower and the middle part of the separation tank, respectively, and the top of the separation tank is provided with a smoke outlet, and at the bottom thereof an acid outlet is connected to a nozzle in washing pipe via a circulating and conveying pipeline which is provided with a circulating pump; A smoke outlet of the said phosphoric acid mist absorption tower is connected to the lower part of the said demisting separation tower which is provided with an online water flushing device, and the top of the demisting separation tower is provided with a smoke outlet which is used for exhausting of the smoke after phosphorus absorption by hydration, and at the bottom thereof an acid outlet is connected to an acid inlet of the phosphoric acid mist absorption tower via a pipeline.

In an embodiment of the present invention, the hydration tower comprises a cooling system, wherein the cooling system comprises the following structure a) and/or b):

a), the outside wall of the chamber in hydration tower is coated by a water-cooling system;

b), on the position near a liquid inlet in the circulating and spraying system for acid is provided with an acid cooler.

In an embodiment of the present invention, the upper part of the demisting separation tower is provided with a mesh demister, and the lower part thereof is provided with a phosphoric acid drop collection structure which is similar to a cyclone duster, and an online water flushing device is installed above the mesh demister.

In an embodiment of the present invention, the spraying device comprises at least two spraying layers which are located at different heights in the chamber of hydration tower, respectively, and the spraying device comprises at least a concentrated phosphoric acid spraying layer and at least a dilute phosphoric acid spraying layer, and the concentrated phosphoric acid spraying layer is located above the dilute phosphoric acid spraying layer; and a liquid inlet of concentrated phosphoric acid spraying layer is connected to the circulating and spraying system for acid; and a liquid inlet of dilute phosphoric acid spraying layer is in communication with a circulating and conveying pipeline in the phosphoric acid mist absorption tower; the conveying pipeline behind the circulating pump in the circulating and spraying system for acid is connected to an acid inlet of the phosphoric acid mist absorption tower via a branch pipe.

The structure of the entire device for fluorine recovery according to the present invention is much more simplified and rational after lots of work in the improvement and optimization of the structure and connection relationship, and the device said satisfies the requirements of the process for phosphorus absorption by hydration. The device for fluorine recovery according to the present invention also has a strong adaptability for the adjustment and optimization of the integrated performance of the device according to the specific requirements of economy, environmental performance, investment costs of the process.

The device for fluorine recovery according to the present invention has a greatly simplified system structure, and decreased cost of investment, operating and maintenance for device with the same functionality effect.

In the preferred solution of the present invention, the optimized limitation of preparation source of smoke after phosphorus absorption by hydration ensures the absorption of both $P_2O_5$ and fluorine in the smoke exiting the kiln and the effective cooperation of process for phosphorus absorption by hydration and the process for fluorine recovery. The main product of phosphoric acid and byproduct of fluorosilicic acid obtained have a great value which ensures a much more effective utilization of raw material source and improvement of the economic benefits of KPA.

In the preferred solution of the present invention, the nearly zero emissions of waste gas, waste materials and waste liquid in preferred solution of the present invention make the process environment friendly.

The device provided by the present invention is fully applicable for direct production of phosphoric acid using low-grade phosphate ore which will be of great importance on the effective utilization of low-grade phosphate ore.

EXAMPLES

Example 1

A Device for Fluorine Recovery from Smoke after Phosphorus Absorption by Hydration in KPA As shown in FIG. 1, a device for fluorine recovery from smoke after phosphorus absorption by hydration in KPA comprises a first-stage fluorine absorption tower 5 and second-stage fluorine absorption tower 6, which are both fluidised counter-current washing towers. The first-stage fluorine absorption tower 5 mainly comprises a fluorosilicic acid washing pipe 51 and a fluorosilicic acid separation tank 52; the inlet and outlet of fluorosilicic acid washing pipe 51 are connected to a conveying pipeline of smoke after phosphorus absorption by hydration and the middle part of the fluorosilicic acid separation tank 52, respectively; the top of the separation tank 52 is provided with a smoke outlet 12, and at the bottom thereof a fluorosilicic acid liquid outlet 53 is connected to a nozzle 35 in fluorosilicic acid washing pipe 51 via a circulating and conveying pipeline which is provided with a circulating pump 2; the fluorosilicic acid separation tank 52 is also an acid circulating tank for the circulating and conveying pipeline.

The main structure of the second-stage fluorine absorption tower 6 is similar to that of the first-stage fluorine absorption tower 5, which mainly comprises a second-stage fluorosilicic acid washing pipe 61 and a second-stage fluorosilicic acid separation tank 62. A smoke outlet 12 of the first-stage fluorine absorption tower 5 is connected to an inlet of second-stage fluorosilicic acid washing pipe 61 via a pipeline and an outlet of fluorosilicic acid washing pipe 61 is connected to the middle part of second-stage fluorosilicic acid separation tank 62. The top of the second-stage fluorosilicic acid separation tank 62 is provided with a defoaming layer and a smoke outlet 12, and at the bottom thereof a fluorosilicic acid liquid outlet 53 is in communication with a nozzle 35 in the second-stage fluorosilicic acid washing pipe 61 via a circulating and conveying pipeline which is provided with a circulating pump 2.

A circulating and conveying pipeline of second-stage fluorine absorption tower 6 is provided with a fluorosilicic acid cooler 63. An inlet of the fluorosilicic acid cooler 63 is connected to a circulating pump 2 and the outlet is divided into two paths, one is connected to a nozzle 35 in the second-stage fluorosilicic acid washing pipe 61 and another is in communication with a spraying layer which is at the top of second-stage fluorosilicic acid separation tank 62, and second-stage fluorosilicic acid separation tank 62 is also used as an acid circulating tank for the circulating and conveying pipeline. An outlet of the circulating pump 2 in second-stage fluorine absorption tower 6 is connected to a liquid inlet of the fluorosilicic acid separation tank 52 in the first-stage fluorine absorption tower 5 via a branch pipe, and thus the extra fluorosilicic acid in second-stage fluorine absorption tower 6 can be transferred into the first-stage fluorine absorption tower 5.

For the emission on standard of all pollutant, a tail gas absorption tower 7 which is an empty spraying tower is installed in the device for fluorine recovery. A smoke inlet 11 of the tail gas absorption tower 7 is connected to a smoke outlet 12 of the second-stage fluorine absorption tower 6. The top of the tail gas absorption tower 7 is provided with a smoke outlet 12, and the upper part of the inside thereof is provided with a spraying layer, and the bottom thereof is provided with an alkali absorption tank (sodium hydroxide). An outlet of the alkali absorption tank is connected to spraying layers in the tail gas absorption tower 7 via a circulating and conveying pipeline which is provided with a circulating pump 2 to from a circulating and spraying system for the absorption of the tail gas.

The said fluorosilicic acid liquid outlet 53 is connected to an external fluorosilicic acid refining equipment 54 (fluoride salts processing equipment) via a pipe which is provided with a feeding pump. The fluorosilicic acid must be pressure filtered by a pressure filter 21 before flowing into the fluorosilicic acid refining equipment 54, and an overflow outlet of the pressure filter 21 is connected to the fluorosilicic acid refining equipment 54.

Example 2

A Process for Fluorine Recovery from Smoke after Phosphorus Absorption by Hydration in KPA The process for fluorine recovery using the device described in example 1 comprises: (1) the first-stage fluorine recovery: the smoke after phosphorus absorption by hydration is conveyed to the fluorosilicic acid washing pipe 51 in the first-stage fluorine absorption tower 5, and the major fluorine (mainly $SiF_4$) in the smoke flowing downward contacts completely with the circulating fluorosilicic acid solution (with a mass concentration of 10 to 20 percent, a temperature of 25° C. to 65° C. and a spraying liquid-gas ratio of 3 $L/m^3$ to 25 $L/m^3$) spraying upward from the nozzle 35, and the thus mass transfer and heat transfer between said smoke and the circulating fluorosilicic acid solution occur, and chemical reaction of said smoke with the circulating fluorosilicic acid solution takes place to form fluorosilicic acid, and most of the enthalpy in the smoke is transferred into circulating fluorosilicic acid solution by heat transfer; the temperature of the smoke is further decreased to a range of 50° C. to 70° C. by adiabatic evaporation of water in circulating fluorosilicic acid solution and heat transfer to circulating fluorosilicic acid solution from the smoke; (2) the first-stage gas-liquid separation: the gas and liquid in the fluorosilicic acid washing pipe 51 is all conveyed to the fluorosilicic acid separation tank 52 for gas-liquid separation, and the gas obtained by separation flows into second-stage fluorosilicic acid washing pipe 61 of the second-stage fluorine absorption tower 6 via the smoke outlet of first-stage fluorine absorption tower 5, and the remaining liquid in the fluorosilicic acid separation tank 52 is conveyed to fluorosilicic acid washing pipe 51 for the operation in step (1) via a circulating and conveying pipeline which is provided with a circulating pump 2;

(3) the second-stage fluorine recovery: the smoke (most remaining fluorine-containing substance is mainly $SiF_4$) flowing downward in the second-stage fluorosilicic acid washing pipe 61 contacts completely with circulating fluorosilicic acid solution (with a mass concentration of 0.5 to 5 percent, a temperature of 25° C. to 60° C. and a spraying liquid-gas ratio of 3 L/m$^3$ to 25 L/m$^3$) sprayed upward by the nozzle, and then the mass transfer and heat transfer between said smoke and circulating fluorosilicic acid solution occur, and chemical reaction of said smoke with circulating fluorosilicic acid solution occurs to form fluorosilicic acid, and the enthalpy in the smoke is partially transferred into circulating fluorosilicic acid solution by heat transfer; the temperature of the smoke processed according to step (3) is further decreased below 60° C.;

(4) the second-stage gas-liquid separation: the gas and liquid in the second-stage fluorosilicic acid washing pipe 61 is all transferred to the second-stage fluorosilicic acid separation tank 62 for gas-liquid separation, and the gas obtained by separation flows into the tail gas absorption tower 7 to be further processed via the smoke outlet of second-stage fluorine absorption tower 6, and the remaining liquid in the fluorosilicic acid separation tank 62 is partially transferred to second-stage fluorosilicic acid washing pipe 62 for the operation in step (3) via a circulating and conveying pipe which is provided with a circulating pump 2. The circulating fluorosilicic acid solution in the second-stage fluorosilicic acid washing pipe 61 is cooled by a fluorosilicic acid cooler 63 which is installed on the circulating and conveying pipe, and a portion of the rest circulating fluorosilicic acid solution is discharged directly into the fluorosilicic acid separation tank 52 in the first-stage fluorine absorption tower 5;

(5) the fluorine in the smoke is accumulated in the circulating fluorosilicic acid solution in the first-stage fluorine absorption tower 5 and second-stage fluorine absorption tower 6. The extra fluorosilicic acid solution in the second-stage fluorine absorption tower 6 is discharged into the first-stage fluorine absorption tower 5, and the extra fluorosilicic acid solution in the first-stage fluorine absorption tower 5 is conveyed to the pressure filter 21 via a feeding pump to be pressure filtered. The filtrate obtained is conveyed to the fluorosilicic acid purification process to form the fluorosilicic acid product or be further processed to form fluorine salts product; the filtration residue which is silica gel is a byproduct after being washed and purified. The smoke in the tail gas absorption tower 7 moving upward comes into a counter-current contact with the circulating absorption solution spraying downward, and the absorption tank at the bottom of the tail gas absorption tower 7 is connected to a spraying layers in the tower via a circulating pump 2 to form a circulating and spraying system; the constant addition of dilute alkali solution (sodium hydroxide solution) is necessary for maintaining a pH value higher than 8 to ensure the absorption capacity of the absorption solution, and the absorption solution needs to be discharged constantly for wastewater treatment because of the addition of dilute alkali solution and accumulation of impurities absorbed, such as $P_2O_5$ and fluorine, in the smoke, and the water after treatment and recovery is used again in KPA; the smoke is further washed and purified by absorption of remaining pollutant ($P_2O_5$, $SiF_4$ and dust etc.) in the smoke to reach the natural discharge standard, and then the smoke is discharged into the chimney by a draught fan.

Figure 3:
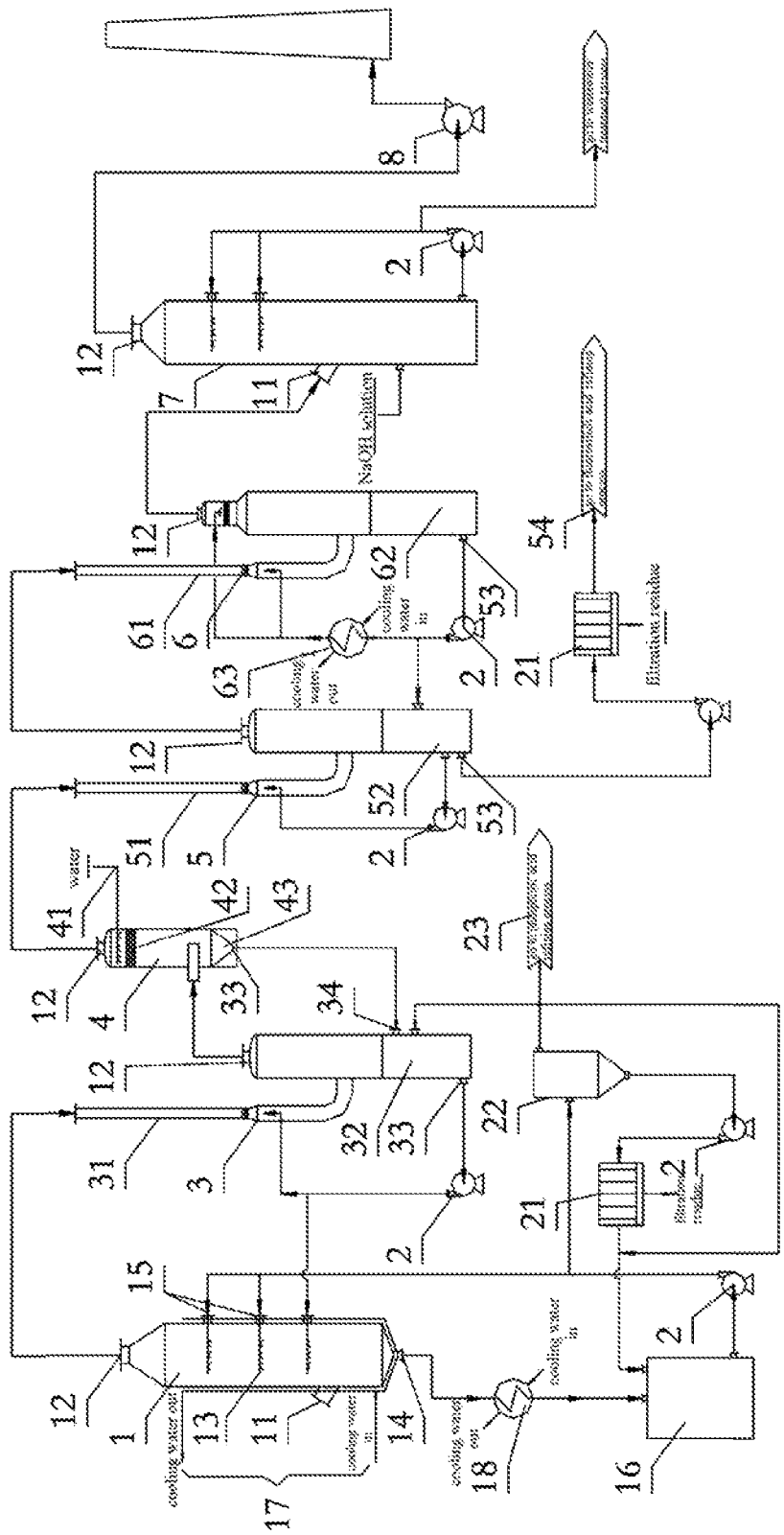
FIG. 3 is a structural schematic view of a system for production of phosphoric acid according to an embodiment of the present invention.
Figure 4:
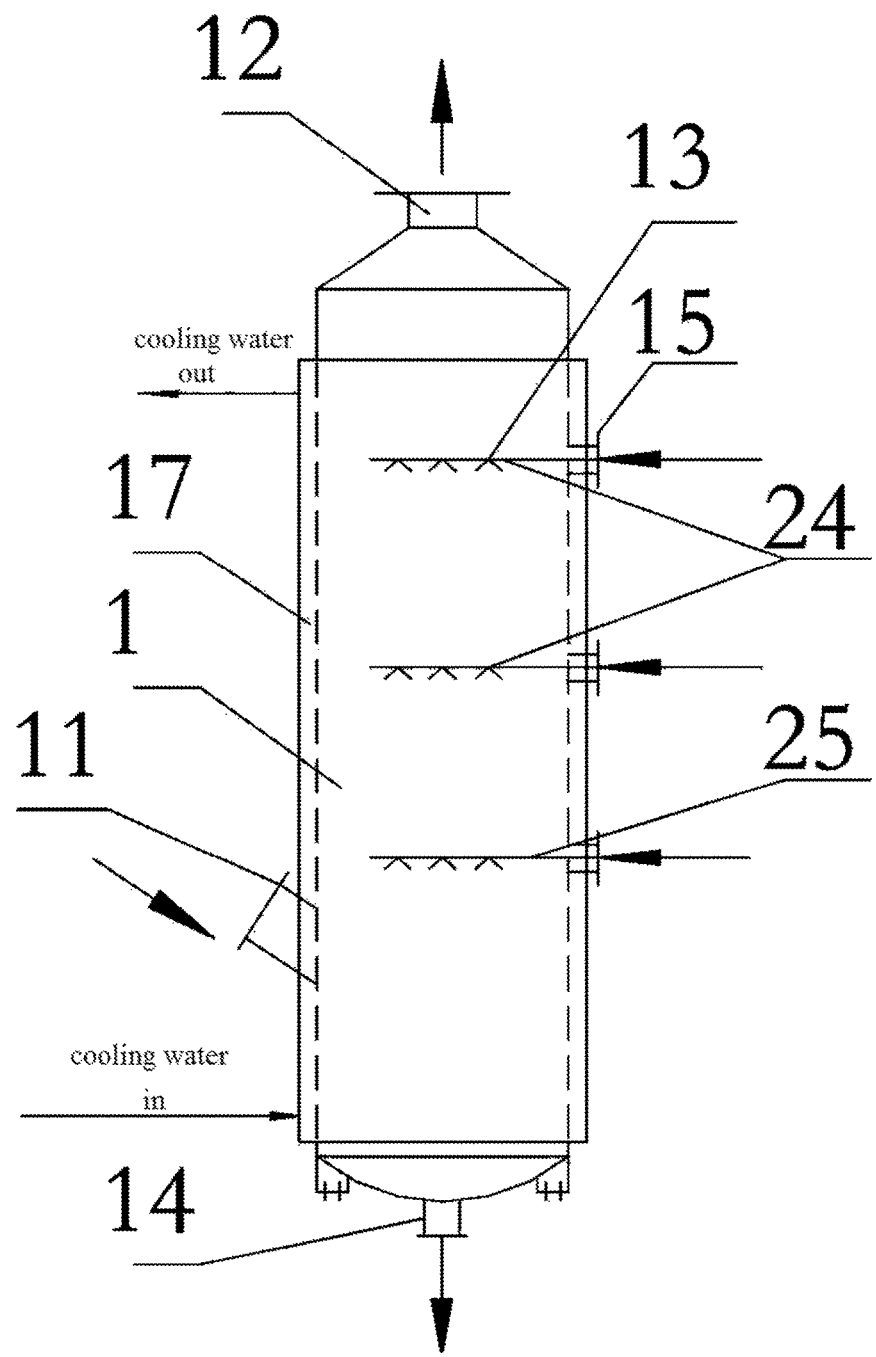
FIG. 4 is an enlarged structural schematic view of a hydration tower in device for production of phosphoric acid according to an embodiment of the present invention.
Figure 5:
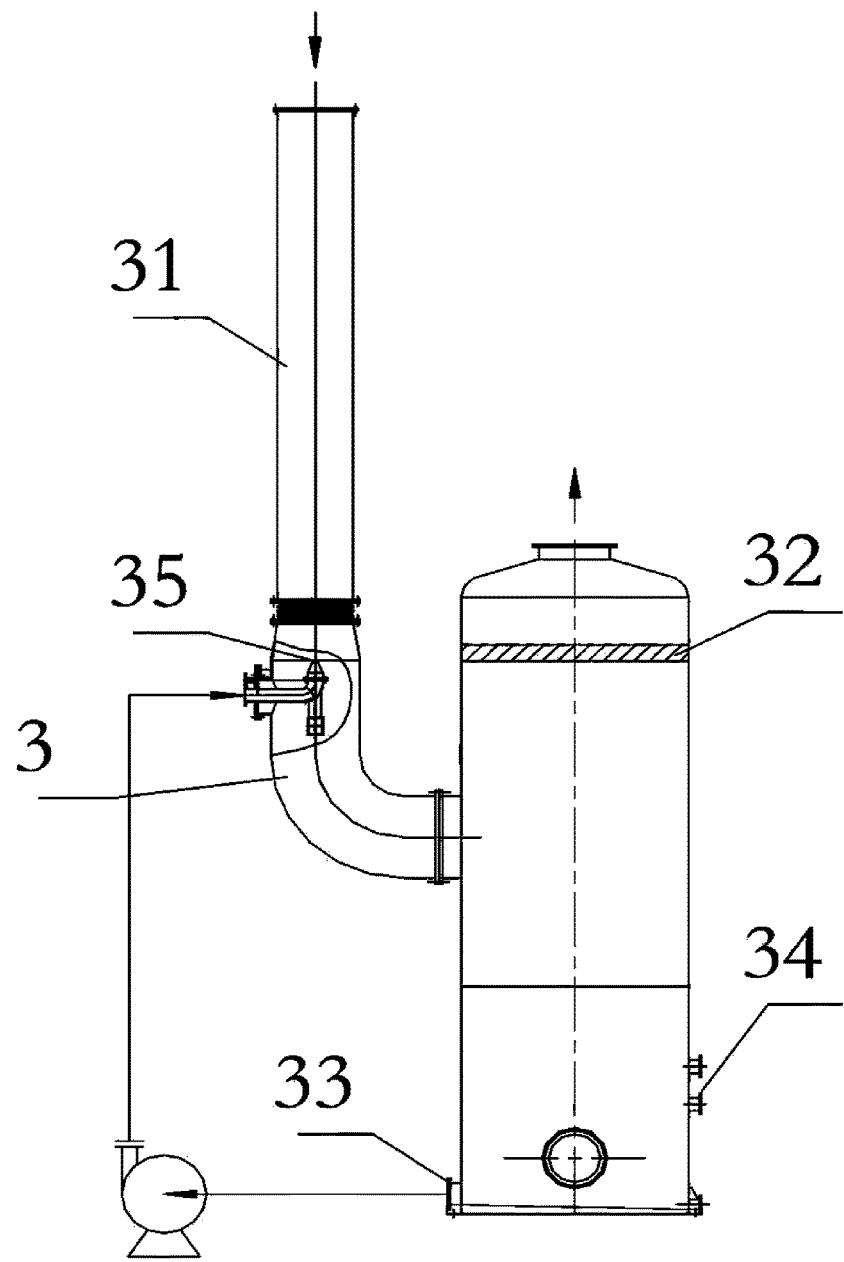
FIG. 5 is an enlarged structural schematic view of a phosphoric acid mist absorption tower in device for the production of phosphoric acid according to an embodiment of the present invention.

The said smoke after phosphorus absorption by hydration is obtained after hydration absorption in phosphoric acid production system shown in FIGS. 3 to 5 which comprises a hydration tower 1, a circulating and spraying system for acid 2, a phosphoric acid mist absorption tower 3 and a demisting separation tower 4.

The hydration tower 1 is an empty spraying tower, and the lower part of the hydration tower 1 is provided with a smoke inlet 11 for the smoke exiting the kiln, and the top thereof is provided with a smoke outlet 12 for the smoke after phosphorus absorption by hydration, and the bottom thereof is provided with a liquid inlet 14 of the circulating and spraying system for acid, and an outlet 15 of the circulating and spraying system for acid is connected to an inlet pipe of a spraying device 13 which is in a chamber which is above the smoke inlet 11, and the circulating and spraying system for acid is also provided with an acid storage tank 16 and a circulating pump 2. In the present embodiment, the outside wall of the chamber in hydration tower 1 is coated by a water-cooling system 17, and the cool water flows into the water-cooling system 17 through the inlet at the bottom and out through the outlet at the top. Additionally, the position near the liquid inlet 14 in the circulating and spraying system for acid is provided with an acid cooler 18; and an outlet of the acid cooler 18 is connected to an inlet of the acid storage tank 16, and an outlet of the acid storage tank 16 is in communication with a liquid inlet of the spraying device 13 to form a circulating and spraying system for acid.

The phosphoric acid mist absorption tower 3 is an effective fluidised counter-current washing tower which mainly comprises a washing pipe 31 and a separation tank 32, and the inlet and outlet of the washing pipe 31 are connected to a smoke outlet 12 of the hydration tower 1 and the middle part of the separation tank 32, respectively, and the top of the separation tank is provided with a smoke outlet 12, and at the bottom thereof an acid outlet 33 is connected to a nozzle 35 in washing pipe 31 via a circulating and conveying pipeline which is provided a circulating pump 2 (see FIG. 5); and the separation tank 32 is also used as an acid circulating tank for the circulating and conveying pipeline in the phosphoric acid mist absorption tower.

For the acid crossflow between the hydration tower 1 and the phosphoric acid mist absorption tower 3, three spraying layers in spraying device 13 which are located at different heights in the chamber of the hydration tower 1 are installed, and the said three spraying layers comprises a dilute phosphoric acid spraying layer 25 and two concentrated phosphoric acid spraying layers 24 (see FIG. 4), and the concentrated phosphoric acid spraying layers 24 are located above the dilute phosphoric acid spraying layer 25; and a liquid inlet of the concentrated phosphoric acid spraying layers 24 is connected to a circulating and spraying system for acid in the hydration tower 1, and a liquid inlet of the dilute phosphoric acid spraying layers 25 is in communication with a circulating and conveying pipeline in the phosphoric acid mist absorption tower 3 for the acid crossflow from the phosphoric acid mist absorption tower 3 to the hydration tower 1. Additionally, a conveying pipeline behind the circulating pump 2 in the circulating and spraying system for acid is connected to an acid inlet 34 of the phosphoric acid mist absorption tower 3 via a branch pipe. However, considering the connection of the process for filtration and purification of phosphoric acid, a packing filter 22 is installed on the branch pipe, and an acid inlet of the packing filter 22 is connected to the circulating and spraying system for acid via the branch pipe, and an acid outlet of the packing filter 22 is divided into three paths: one is connected to an acid inlet 34 in the phosphoric acid mist absorption tower 3, and another one is in communication with the external phosphoric acid refining equipment 23, and the other is connected to an acid storage tank 16; and a underflow outlet of the packing filter 22 is connected to a feeding inlet of the pressure filter 21 via a pipeline, and an overflow outlet of the pressure filter 21 is in communication with the acid storage tank 16 in the circulating and spraying system for acid to ensure the recovery and a high yield of phosphoric acid.

The smoke outlet 12 of the phosphoric acid mist absorption tower 3 is connected to the lower part of the demisting separation tower 4, and the top of the demisting separation tower 4 is provided with a smoke outlet 12 which is used for exhausting of the smoke after phosphorus absorption by hydration, and at the bottom thereof an acid outlet 33 is connected to an acid inlet 34 of the phosphoric acid mist absorption tower 3 via a pipeline. An online water flushing device is installed in the demisting separation tower 4, and the water added into the online water flushing device is also used as supplied water to the entire process for production of phosphoric acid by hydration absorption, and said water returns to the phosphoric acid mist absorption tower 3 and the hydration tower 1 step-by-step via a pipeline. The upper part of the demisting separation tower 4 is installed with a mesh demister 42, and the lower part thereof is provided with a phosphoric acid drop collection structure 43 which is similar to a cyclone duster, and the online water flushing device 41 is installed above the mesh demister 42.

Example 3

The Mechanism of the Production System of Phosphoric Acid

1. The Absorption of $P_2O_5$ by Hydration in Hydration Tower:

The smoke contains $P_2O_5$ and fluorine (a particular case is the smoke in the KPA with a temperature higher than 500° C. and a content of $P_2O_5$ of 80 g/Nm$^3$) is pumped into the tower via the smoke inlet 11 at the lower part of the hydration tower 1 following the starting of the circulating pump 2 in the circulating and spraying system for acid, and thus the spraying of the concentrated phosphoric acid in the hydration tower 1 from the upper and middle concentrated phosphoric acid spraying layers 24 with the spraying of the concentrated phosphoric acid from a portion of nozzles in the upper concentrated phosphoric acid spraying layer 24 to the inner wall of the tower in an oblique direction, and the concentrated phosphoric acid is sprayed from nozzles in other concentrated phosphoric acid spraying layers 24 in a vertical direction. The phosphoric acid is sprayed from the nozzles in the middle and lower spraying layers in a vertical direction. The transfer of mass and heat takes place after a complete contact of the spraying concentrated phosphoric acid and the smoke containing $P_2O_5$ and fluorine fed into the tower, and $P_2O_5$ in the smoke reacts with the water in the concentrated phosphoric acid to form phosphoric acid, and over half the phosphoric acid obtained in the chemical reaction is absorbed by the spraying liquid and the other is remained in the gas in form of phosphoric acid mist, however, the fluorine (mainly $SiF_4$ and HF etc.) in the smoke is hardly absorbed by the spraying liquid under a condition with concentrated phosphoric acid and a high temperature; and the temperature of the smoke in decreased to a range of 75° C. to 130° C. after the heat transfer between the smoke and circulating and spraying concentrated phosphoric acid of lower temperature and cooling of the smoke by the water-cooling system 17 in the hydration tower 1, and the temperature of the circulating concentrated phosphoric acid out of the hydration tower 1 is increased to a range of 70° C. to 95° C. The mass concentration of the circulating and spraying concentrated phosphoric acid is adjustable in the range of 60 to 90 percent (70 to 85 percent in the present embodiment), and the temperature of concentrated phosphoric acid fed into the hydration tower is controlled in the range of 50° C. to 80° C., and the spraying liquid-gas ratio can be adjusted in the range of 3 L/m$^3$ to 20 L/m$^3$ according to the content of water in the smoke. The phosphoric acid mist is hardly subsided in the hydration tower 1 and then exhausted with the smoke exiting the hydration tower 1. The hydration tower 1 has the function of both cooling of the smoke and absorption of $P_2O_5$ by hydration, and the chemical reaction in hydration tower 1 is as follows:

$P_2O_5 + 3H_2O = 2H_3PO_4$

After being sprayed, the concentrated phosphoric acid in the hydration tower 1 flows into the circulating and spraying system for acid via the liquid inlet 14 and then into the acid cooler 18 which is an agitating tank with a heat exchange plate which is made of several stainless steel tubes, and inside the stainless steel tubes is fed the circulating and cooling water. The forced convection heat transfer between the phosphoric acid flowing into the acid cooler 18 and the heat exchange plate with stirring of the liquid occurs, and with an increased efficiency of heat transfer, the heat in the circulating concentrated phosphoric acid is constantly transferred by the circulating and cooling water with the transfer of a portion of enthalpy in the concentrated phosphoric acid to the circulating and cooling water in the acid cooler 18. The circulating acid out from the outlet of the acid cooler 18 flows into the acid storage tank 16 and then is sent back again to the nozzles in the upper and middle circulating and spraying layers by the circulating pump 2 for circulating and spraying.

2. The Absorption of Phosphoric Acid Mist in the Phosphoric Acid Mist Absorption Tower:

The gas exhausted from the smoke outlet 12 at the top of the hydration tower 1 is conveyed to the washing pipe 31 in phosphoric acid mist absorption tower 3, which is a fluidised counter-current washing tower. The circulating dilute phosphoric acid sprayed upward in the washing pipe 31 collides and contacts with the smoke flow running downward with a high speed to form an intensive turbulent area in the gas-liquid interface area, and the smoke passes through the stable foam zone (foam column) with a certain height which is formed after the balance of fluid momentum and contacts with large-area phosphoric acid solution surface which is constantly updated, and the capture, collection and polymerization of particles and transmission of heat take place in the foam zone. The most of phosphoric acid mist in the smoke is absorbed by circulating dilute phosphoric acid, and the superficial velocity of the smoke and liquid-gas ratio in the absorption zone are in the range of 10 m/s to 30 m/s and 3 L/m$^3$ to 25 L/m$^3$, respectively. The temperature of the smoke is further decreased to a range of 60° C. to 75° C. by adiabatic evaporation of water in circulating dilute phosphoric acid solution. Compared with the traditional Venturi demister in a hot process for production of phosphoric acid, the utilization of phosphoric acid mist absorption tower according to the present invention can make both the dynamic pressure head loss of the device and energy consumption of the acid storage installation reduced with the same removal effect of mist.

The circulating and spraying acid in phosphoric acid mist absorption tower 3 is dilute phosphoric acid with a mass concentration of 10 to 50 percent. The gas and liquid in the washing pipe 31 are transferred to the separation tank 32 located at the lower part of the tower for gas-liquid separation, and the circulating acid obtained by separation is remained in the separation tank 32 which is also used as a circulating acid tank. The dilute phosphoric acid can be sent back by the circulating pump 2 to the washing pipe 31 or the dilute phosphoric acid spraying layer 25 in the hydration tower 1 for acid crossflow according to the actual requirements.

3. The Absorption of Phosphoric Acid Mist in Demisting Separation Tower:

The smoke exhausted from the smoke outlet 12 in the phosphoric acid mist absorption tower 3 is conveyed to the demisting separation tower 4 for further separation of gas and liquid to further remove phosphoric acid mist in the smoke. The lower part of the demisting separation tower 4 is provided with a phosphoric acid drop collection structure 43 which is similar to a cyclone duster, and the upper part thereof is provided with a mesh demister 42, and grown phosphoric acid drop is separated by centrifugation and collected in the phosphoric acid drop collection structure 43, and the phosphoric acid drop which is not grown up is further separated and collected by the mesh demister 42 to ensure a direct yield of $P_2O_5$ in the device; and the smoke after phosphorus absorption by hydration exhausted from the demisting separation tower 4 is conveyed to the device for fluorine recovery.

The process of absorption by hydration requires a constant supply of water because of the consumption of water in the chemical reaction with $P_2O_5$ in the process for absorption of phosphoric acid by hydration and the evaporation of water in the spraying acid in cooling process of the smoke. In the present embodiment, all of the supplied water is fed into the smoke outlet 12 in the demisting separation tower 4 and thus the online water flushing device 41 is used as both a device for supplying water and a device for flushing the mesh demister in the demisting separation tower 4. The concentration of the circulating acid in the phosphoric acid mist absorption tower 3 will be decreased gradually because all the supplied water is added into the demisting separation tower 4, and the base solution in the demisting separation tower 4 is sent back to the phosphoric acid mist absorption tower 3 from the acid inlet 34, and on the other hand, the concentration of the circulating acid in the hydration tower 1 will be increased gradually because of the constant absorption of $P_2O_5$ in the smoke, therefore, the crossflow between the circulating acid in the hydration tower 1 and the phosphoric acid mist absorption tower 3 is necessary for the stabilization of the concentration of the respective circulating acid, and the acid for crossflow in the hydration tower 1 needs to be cleared and filtered by the packing filter 22 firstly and then conveyed to the phosphoric acid mist absorption tower 3, and the acid for crossflow in the phosphoric acid mist absorption tower 3 is directly leaded from the outlet of the circulating pump 2 in the phosphoric acid mist absorption tower 3 to the hydration tower 1, and the extra phosphoric acid in the process system (according to the based on the material balance) is conveyed to the refining process from the outlet of supernatant in the packing filter 22 to form the concentrated phosphoric acid product after the addition of activated carbon, diatomaceous earth, and barium salt for the removal of the color the crude phosphoric acid and sulfate ion and filtration by the plate and frame pressure filter. Furthermore, the most of the solid particles, such as dust, in the smoke is transferred into the circulating phosphoric acid solution and then enriched in the underflow in the packing filter 22 which is discharged regularly into the pressure filter 21 for filtration, and the filtrate obtained is sent back to the acid.

The invention claimed is:

1. A process for recovering fluorine from a smoke generated from a Kiln Phosphoric Acid (KPA) process using a device, wherein phosphorus in form of $P_2O_5$ in the smoke has been absorbed by hydration before recovering fluorine from the smoke, wherein the device comprises a first-stage and second-stage fluorine absorption towers, wherein the first-stage and second-stage fluorine absorption towers both are fluidised counter-current washing towers, and the first-stage fluorine absorption tower mainly comprises a first-stage fluorosilicic acid washing pipe and a first-stage fluorosilicic acid separation tank, and the second-stage fluorine absorption tower mainly comprises a second-stage fluorosilicic acid washing pipe and a second-stage fluorosilicic acid separation tank, wherein the process comprises the following steps:

(1) performing a first-stage fluorine recovery, wherein the smoke is introduced into a top of the first-stage fluorosilicic acid washing pipe, and a first fluorosilicic acid solution is introduced into a bottom of the first-stage fluorosilicic acid washing pipe from the first-stage fluorosilicic acid separation tank and is sprayed from the bottom to the top of the first-stage fluorosilicic acid washing pipe, such that the smoke is contacted with the first fluorosilicic acid solution by convection in the first-stage fluorosilicic acid washing pipe, wherein during contacting, mass transfer and heat transfer between the smoke and the first fluorosilicic acid solution occur, and meanwhile fluorine in form of $SiF_4$ contained in the smoke reacts with water in the first fluorosilicic acid solution to form a fluorosilicic acid which dissolves in the first fluorosilicic acid solution, and an enthalpy of the smoke is partially transferred into the first fluorosilicic acid solution such that water in the first fluorosilicic acid solution becomes a steam by adiabatic evaporation;

(2) performing a first-stage gas-liquid separation, wherein a gas and liquid from the first-stage fluorosilicic acid washing pipe are introduced into the first-stage fluorosilicic acid separation tank for gas-liquid separation, and a gas obtained by separation flows into the second-stage fluorosilicic acid washing pipe via a smoke outlet of the first-stage fluorine absorption tower, and a liquid remained in the first-stage fluorosilicic acid separation tank is introduced into the first-stage fluorosilicic acid washing pipe via a first circulating and conveying pipeline provided with a first circulating pump to perform the first-stage fluorine recovery;

(3) performing a second-stage fluorine recovery, wherein a smoke from the first-stage gas-liquid separation is introduced into a top of the second-stage fluorosilicic acid washing pipe, a second fluorosilicic acid solution is introduced into a bottom of the second-stage fluorosilicic acid washing pipe from the second-stage fluorosilicic acid separation tank and is sprayed from the bottom to the top of the second-stage fluorosilicic acid washing pipe, such that the smoke from the first-stage gas-liquid separation is contacted with the second fluorosilicic acid solution by convection in the second-stage fluorosilicic acid washing pipe, wherein during contacting, mass transfer and heat transfer between the smoke and the second fluorosilicic acid solution occur, and meanwhile fluorine in form of $SiF_4$ contained in the smoke reacts with water in the second fluorosilicic acid solution to form a fluorosilicic acid which dissolves in the second fluorosilicic acid solution, and an enthalpy of the smoke is partially transferred into the second fluorosilicic acid solution such that water in the second fluorosilicic acid solution becomes a steam;

(4) performing a second-stage gas-liquid separation, wherein a gas and liquid from the second-stage fluorosilicic acid washing pipe are introduced to the second-stage fluorosilicic acid separation tank for gas-liquid separation, and a gas obtained by separation flows into a tail gas absorption tower to be further processed via a smoke outlet of the second-stage fluorine absorption tower, and a part of a liquid remained in the second-stage fluorosilicic acid separation tank is introduced into the second-stage fluorosilicic acid washing pipe via a second circulating and conveying pipeline provided with a second circulating pump to perform the second-stage fluorine recovery, and a part of the liquid remained in the second-stage fluorosilicic acid separation tank is introduced into the first-stage fluorosilicic acid separation tank.

2. The process according to claim 1, wherein in the step (1) a mass concentration and temperature of the first fluorosilicic acid solution in the first-stage fluorine recovery are in the range of 8 to 25 percent and 25 to 65° C., respectively, and a sprayed amount by "L" of the first fluorosilicic acid solution relative to a volume by "$m^3$" of the smoke introduced into the first-stage fluorosilicic acid washing pipe is controlled in the range of 3 $L/m^3$ to 25 $L/m^3$; and in the step (3) a mass concentration and temperature of the second fluorosilicic acid solution in the second-stage fluorine recovery are in the range of 0.5 to 5 percent and 25 to 60° C., respectively, and a sprayed amount by "L" of the second fluorosilicic acid relative to a volume by "$m^3$" of the smoke introduced into the second-stage fluorosilicic acid washing pipe is controlled in the range of 3 $L/m^3$ to 25 $L/m^3$.

3. The process according to claim 2, wherein in the step (1) the mass concentration and temperature of the first fluorosilicic acid solution in the first-stage fluorine recovery are in the range of 10 to 20 percent and 50 to 65° C., respectively, and the sprayed amount by "L" of the first fluorosilicic acid solution relative to the volume by "$m^3$" of the smoke introduced into the first-stage fluorosilicic acid washing pipe is controlled in the range of 3 $L/m^3$ to 6 $L/m^3$; and in the step (3) the mass concentration and temperature of the second fluorosilicic acid solution in the second-stage fluorine recovery are in the range of 0.5 to 5 percent and 45 to 60° C., respectively, and the sprayed amount by "L" of the second fluorosilicic acid solution relative to the volume by "$m^3$" of the smoke introduced into the second-stage fluorosilicic acid washing pipe is controlled in the range of 3 $L/m^3$ to 6 $L/m^3$.

4. The process according to claim 1, wherein the step (3) further comprises cooling the second fluorosilicic acid solution before introducing it into the second-stage fluorosilicic acid washing pipe by a fluorosilicic acid cooler, wherein a temperature of a smoke processed by the step (3) decreases below 60° C.

* * * * *